Sept. 21, 1943. H. J. LUFF 2,329,997
CLEANOUT PROTECTED WATER SEAL TRAP
Filed Sept. 22, 1941
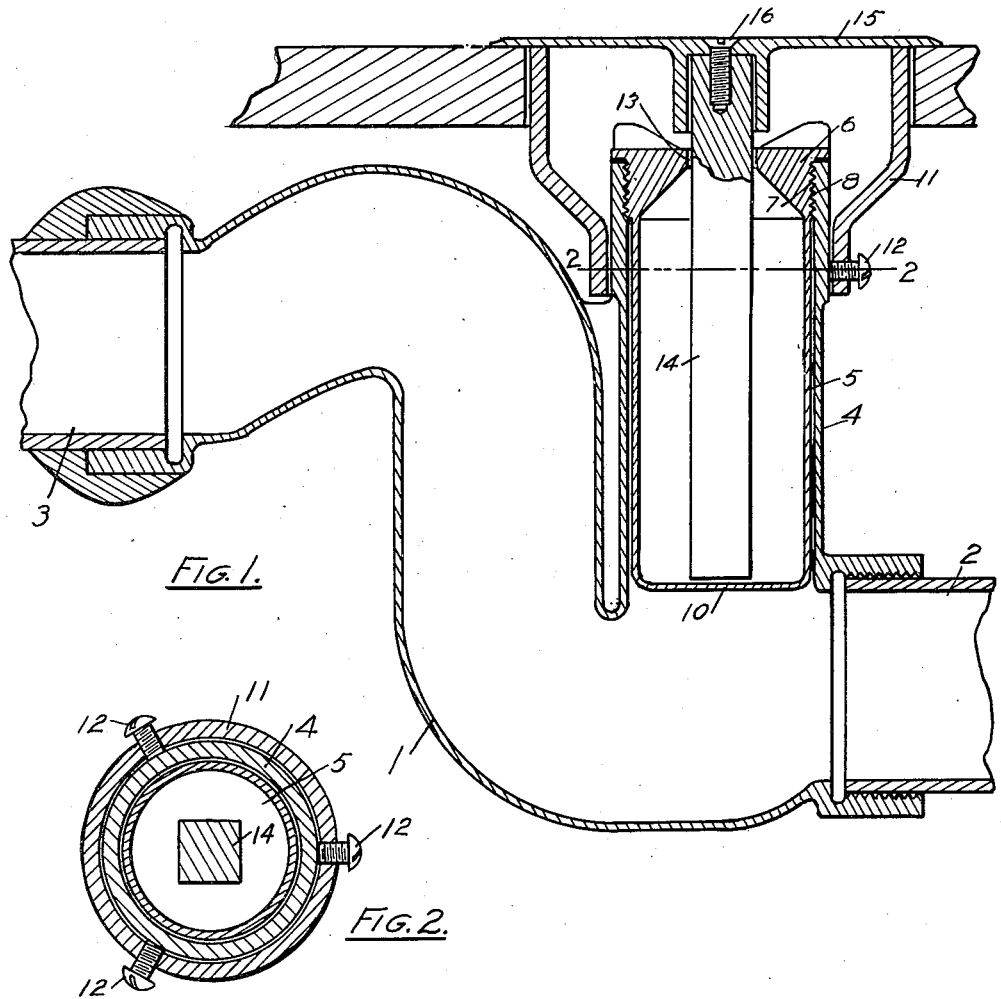
INVENTOR.
Henry J. Luff
BY
Florian G. Miller
ATTORNEY.

Patented Sept. 21, 1943

2,329,997

UNITED STATES PATENT OFFICE 2,329,997

CLEANOUT PROTECTED WATER SEAL TRAP

Henry J. Luff, Cleveland, Ohio, assignor to J. A. Zurn Manufacturing Company, Erie, Pa., a corporation of Pennsylvania Application September 22, 1941, Serial No. 411,880

2 Claims. (Cl. 182—24)

This invention relates generally to traps and more particularly to improvements in traps for use under any fixture from which the discharge enters directly or indirectly into a building sewer or building drain.

All devices of this character made according to the prior art, and with which I am familiar, have been so constructed that the passage leading to the cleanout opening in the floor would become fouled with drainage matter and the odor therefrom would become unbearable. Prior devices of this character were not self-scouring.

It is, accordingly, an object of my invention to overcome the above and other defects in traps, and it is more particularly an object of my invention to provide a trap which is easy to install, economical in manufacture, efficient in operation, and economical in cost.

Another object of my invention is to provide a trap which requires a minimum amount of space for installation thereof.

Another object of my invention is to provide a self-scouring trap.

Another object of my invention is to provide a plunger in a cleanout opening of a trap to maintain cleanliness therein.

Another object of my invention is to provide an adjustable collar around the cleanout opening portion of the trap.

Other objects of my invention will become evident from the following detailed description taken in conjunction with the accompanying drawing in which:

Fig. 1 is a cross sectional view of my novel self-scouring trap.

Fig. 2 is a view taken on the line 2—2 of Fig. 1.

Referring to the drawing, Fig. 1 shows a trap member 1 having an inlet opening 2, and an outlet opening 3. Immediately adjacent the inlet opening 2 is formed an extended cleanout portion 4 forming the cleanout opening for the trap. A plunger 5 is disposed in the extended portion 4 and reciprocates therein. The plug 6 is integral with the plunger 5 and has a threaded portion 7 which engages the threaded portion 8 on the inner upper side of the extended portion 4 to secure the plunger in the extended portion 4. The bottom portion 10 of the plunger 5 extends to substantially the upper side of the inlet opening so as to provide no projecting parts to gather fouling matter and thereby assures self-scouring of the trap. A collar 11 surrounds the extended cleanout portion 4 and is adjustably movable therealong. A set screw 12 is provided to secure the collar 11 on the extended cleanout portion when the collar 11 is adjusted to the height of the floor. The cleanout plug 6 has a polyhedral opening 13 for receiving a longitudinally extending polyhedral member 14. A wrench or other implement may be applied to the polyhedral member 14 for turning the cleanout plug 6 and removing the cleanout plug 6 and the plunger 5 from the extended cleanout portion 4. A cover member 15 is disposed over the collar 11 and is secured to the polyhedral member 14 by a set screw 16.

In operation, the plunger 5 is disposed as shown in Fig. 1 whereby the drainage matter passes through the body of the trap, past the bottom 10 of the plunger 5 with nothing to impede the flow thereof and with no recesses to permit the gathering of fouling matter. When it is desired to clean the trap, the cover 15 is removed and the cleanout plug 6 is turned by applying a wrench to the polyhedral member 14. The turning of the cleanout plug 15 causes the plunger 5 to move upwardly in the cleanout portion 4. With the plug 6 removed, the trap can be readily cleaned. It will be apparent that no fouling matter can form in the cleanout portion 4 of the trap. The collar 11 is adjusted to the height of the floor upon initial installation of the trap.

It will be apparent from the above description that I have provided a self-scouring trap wherein an extended cleanout portion is provided with a plunger therein, and a protecting collar surrounds the extending cleanout portion of the trap adjustable to the height of the floor.

Various changes may be made in the specific embodiment of the present invention without departing from the spirit thereof or from the scope of the appended claims.

What I claim is:

1. In a water sealing trap, in combination, a body member having an inlet and an outlet and an extended cleanout portion, a plug in said cleanout portion having a polyhedral aperture therein, a plunger secured to said cleanout plug, and a polyhedral member disposed in said polyhedral aperture in said cleanout plug and freely movable therein for turning said cleanout plug.

2. In a water sealing trap, in combination, a body member having an inlet and an outlet and an extended cleanout portion adjacent said inlet, a plug in said cleanout portion having a polyhedral aperture therein, a plunger in said cleanout portion secured to said plug, a polyhedral member disposed in said polyhedral aperture in said plug for turning said plug, a collar surrounding said cleanout portion and secured thereto, and a cover plate secured to the outer end of said polyhedral member.

HENRY J. LUFF.